United States Patent Office 3,360,386
Patented Dec. 26, 1967

3,360,386
GLASS FIBER COMPOSITION
Lawrence W. Kelley, West Covina, Albert Lewis, Covina, and Jason D. Provance, Glendora, Calif., assignors to Aerojet-General Corporation, Azusa, Calif., a corporation of Ohio
No Drawing. Filed Oct. 10, 1963, Ser. No. 315,347
14 Claims. (Cl. 106—50)

ABSTRACT OF THE DISCLOSURE

An improved glass composition, especially suitable for glass fiber manufacture having high tensile strength and containing typically 67% to 74% silica, 6.5% to 10% aluminum oxide, 6.5% to 10% sodium oxide, 6.5% to 10% magnesium oxide and 3% to 6% calcium oxide, and up to 2.5% antimony oxide.

---

This invention relates to glass compositions and particularly to glass compositions and fibers having high strength, high modulus of elasticity and high durability at high temperatures.

There has been a demand for fiber glass compositions which can be successfully drawn into fibrous form, particularly for use in laminates and structural materials where high strength, high modulus of elasticity and high temperature resistance are important. The problems of achieving these characteristics has long been recognized in the glass art; however, no completely satisfactory composition has been available for forming long staple glass fibers having the desired characteristics. High temperature glass compositions have heretofore been produced but they are subject to the drawbacks of having a short working temperature range and to the producing of a preponderance of short fibers which are not adaptable to high strength structural components.

The object of this invention is to provide a glass which will possess the properties lacking in the glass of the prior art. Thus, the object of this invention is to provide a glass which has a high strength and a high modulus of elasticity.

Another object is to provide a glass which has high strength that can be drawn into long staple glass fibers.

A further object is to provide a method for producing this glass.

The present invention provides glass which is capable of being drawn continuously into roving or parallel mat form and which is characterized as having high strength, a high modulus of elasticity and high durability at high temperatures. The material of this invention differs from high temperature glasses heretofore employed in its resistance to devitrification. Thus, the present glass has improved strength and is free from impurities so that continuous staple fibers may be produced.

The glass of the present invention may be used in any area where high strength and a high modulus of elasticity are required. This includes its use in a resinous or plastic matrix for rocket motor cases and as a reinforcement for inorganic as well as organic matrices.

The compositions of the present invention provide approximately a 50% increase in tensile strength and approximately a 10% increase in modulus of elasticity over known commercially available compositions. The compositions of the present invention have the following compositions:

About 67% to about 74% silica,
About 6.5% to about 10% aluminum oxide,
About 6.5% to about 10% sodium oxide,
About 6.5% to about 10% magnesium oxide,
About 3% to about 6% calcium oxide,
Up to about 2.5% antimony oxide.

Trace impurities are also present in the glass but occur in such small quantities, less than about 0.02%, that they do not affect the composition.

The glasses of the present invention are prepared by melting batches within the following approximate ranges at temperatures of between about 2600° F. to about 2900° F. in conventional refractory containers. The batch compositions are based upon 1000 parts sand by weight indicating the proportion by weight of the components:

Sand 1000 parts
Aluminum hydrate about 148 parts to about 207 parts
Sodium carbonate about 167 parts to about 233 parts
Magnesium carbonate about 227 parts to about 315 parts
Crushed limestone about 84 parts to about 153 parts
Antimony oxide 0 part to about 34 parts The batch components are weighed in a dry powdered or granular form and mixed in a conventional mixer or tumbler such as a cement mixer. The dry batch may then be dampened with water to prevent loss from dusting while the batch is being transferred to the furnace. The batch is then placed into the furnace which has already been brought to the desired melt temperature. No mechanical stirring of the batch in the furnace is necessary since the bubbles which form during the melting process act to provide circulation. Samples of glass are taken from the furnace at periodic intervals to determine when the glass has reached uniform compostion. This is generally after the sand, which is last to melt completely, has dissolved.

The glass may then flow directly to a bushing for fiber production if a direct melt process is used or the glass may be cooled to a frit or marble form and then remelted in a fiber bushing if a marble feeding process is utilized.

The molten glass is drawn into fibers on a conventional drawing wheel at speeds up to 12,000 feet per minute and temperatures of between about 2300° to about 2900° F. Speeds of between about 5000 to about 10,000 feet per minute are preferred in order to give optimum filament properties.

The fibers may be drawn from about 0.0001 to about 0.004 inch in diameter although diameters of between about 0.00035 and 0.0004 inch are preferred for maximum fiber properties.

To further illustrate the invention, there are presented the following examples in which all parts and percentages are by weight unless otherwise indicated:

EXAMPLE I

The following batch was mixed in a dry granular form as discussed above and melted in a conventional refractory furnace at a temperature between 2600° F. and 2900° F.:

237.6 parts sand
42.0 parts aluminum hydrate
51.0 parts sodium carbonate
70.0 parts magnesium carbonate
30.0 parts crushed limestone The following glass was obtained:

About 69.80% $SiO_2$
About 8.04% $Al_2O_3$
About 8.68% $Na_2O$
About 8.71% $MgO$
About 4.76% $CaO$ The glass was cooled to frit form and remelted in a conventional resistance heated bushing for fiberizing. The molten glass was formed into fibers on a conventional drawing wheel at 2570° F. at a speed of 9300 feet per minute. The glass fibers were found to have the following properties:

Average tensile strength 689 thousands p.s.i.
Average modulus of elasticity 12.3 million p.s.i.

The following batch compositions were mixed and melted as discussed above and formed into fibers as described in Example I in the following Examples II through XI:

EXAMPLE II 237.6 parts sand
52.0 parts aluminum hydrate
51.0 parts sodium carbonate
60.0 parts magnesium carbonate
30.0 parts crushed limestone The following glass was obtained:
 About 69.33% $SiO_2$
 About 9.87% $Al_2O_3$
 About 8.63% $Na_2O$
 About 7.44% MgO
 About 4.72% CaO The molten glass was formed into fibers on a conventional drawing wheel at 2550° F. at a speed of 9300 feet per minute. The glass fibers were found to have the following properties:
 Average tensile strength 660 thousand p.s.i.
 Average modulus of elasticity 12.2 million p.s.i.

When Example II is repeated using sufficient aluminum hydrate to give an alumina content of about 6.5%, a good glass is obtained.

EXAMPLE III 237.6 parts sand
42.0 parts aluminum hydrate
51.0 parts sodium carbonate
36.15 parts magnesium carbonate
30.0 parts crushed limestone The following glass was obtained:
 About 70.71% $SiO_2$
 About 8.14% $Al_2O_3$
 About 8.80% $Na_2O$
 About 7.59% MgO
 About 4.74% CaO The molten glass was formed into fibers on a conventional drawing wheel at 2570° F. at a speed of 9300 feet per minute. The glass fibers were found to have the following properties:
 Average tensile strength 651 thousand p.s.i.
 Average modulus of elasticity 11.5 million p.s.i.

When Example III is repeated using sufficient sand to give a silica content of about 74%, a good glass is obtained.

EXAMPLE IV 237.6 parts sand
42.0 parts aluminum hydrate
51.0 parts sodium carbonate
60.0 parts magnesium carbonate
30.0 parts crushed limestone The following glass was obtained:
 About 70.66% $SiO_2$
 About 8.14% $Al_2O_3$
 About 8.79% $Na_2O$
 About 7.58% MgO
 About 4.81% CaO The molten glass was formed into fibers on a conventional drawing wheel at 2630° F. at a speed of 6000 feet per minute. The glass fibers were found to have the following properties:
 Average tensile strength 648 thousand p.s.i.
 Average modulus of elasticity 11.6 million p.s.i.

When Example IV is repeated using sufficient sodium carbonate to give a sodium oxide content of about 10%, a good glass is obtained.

EXAMPLE V 237.6 parts sand
42.0 parts aluminum hydrate
40.8 parts sodium carbonate
36.15 parts magnesium carbonate
30.0 parts crushed limestone The following glass was obtained:
 About 71.99% $SiO_2$
 About 8.29% $Al_2O_3$
 About 7.16% $Na_2O$
 About 7.73% MgO
 About 4.82% CaO The molten glass was formed into fibers on a conventional drawing wheel at 2570° F. at a speed of 9300 feet per minute. The glass fibers were found to have the following properties:
 Average tensile strength 619 thousand p.s.i.
 Average modulus of elasticity 10.8 million p.s.i.

EXAMPLE VI 237.6 parts sand
51.0 parts aluminum hydrate
51.0 parts sodium carbonate
36.15 parts magnesium carbonate
30.0 parts crushed limestone The following glass was obtained:
 About 69.52% $SiO_2$
 About 9.70% $Al_2O_3$
 About 8.65% $Na_2O$
 About 7.46% MgO
 About 4.66% CaO The molten glass was formed in fibers on a conventional drawing wheel at 2570° F. at a speed of 9300 feet per minute. The glass fibers were found to have the following properties:
 Average tensile strength 688 thousand p.s.i.
 Average modulus of elasticity 11.7 million p.s.i.

The addition of antimony oxide to the glass compositions has been found to be effective in producing a clear, seed free glass thus enhancing filament properties. The following compositions were prepared in the manner described above with the following results:

EXAMPLE VII 237.6 parts sand
42.0 parts aluminum hydrate
40.8 parts sodium carbonate
60.0 parts magnesium carbonate
30.0 parts crushed limestone
7.68 parts antimony oxide The following glass was obtained:
 About 70.26% $SiO_2$
 About 8.09% $Al_2O_3$
 About 7.05% $Na_2O$
 About 7.54% MgO
 About 4.78% CaO
 About 2.27% $Sb_2O_3$ The molten glass was formed into fibers on a conventional drawing wheel at 2650° F. at a speed of 9000 feet per minute. The glass fibers were found to have the following properties:
 Averabe tensile strength 654 thousand p.s.i.
 Average modulus of elasticity 11.3 million p.s.i.

EXAMPLE VIII 237.6 parts sand
42.0 parts aluminum hydrate
40.8 parts sodium carbonate
60.0 parts magnesium carbonate
20.0 parts of crushed limestone
7.68 parts antimony oxide The following glass was obtained:
 About 71.41% $SiO_2$
 About 8.22% $Al_2O_3$
 About 7.17% $Na_2O$
 About 7.61% MgO
 About 3.26% CaO
 About 2.31% $Sb_2O_3$ The molten glass was formed into fibers on a conventional drawing wheel at 2720° F. at a speed of 6000 feet per minute. The glass fibers were found to have the following properties:
  Average tensile strength 687 thousand p.s.i.
  Average modulus of elasticity 12.2 million p.s.i.

When example VIII is repeated using sufficient magnesium carbonate to give a magnesium oxide content of about 10%, a good glass is obtained.

EXAMPLE IX 237.6 parts sand
41.97 parts aluminum hydrate
46.05 parts sodium carbonate
59.35 parts magnesium carbonate
30.43 parts crushed limestone
3.85 parts antimony oxide The following glass was obtained:
  About 70.50% $SiO_2$
  About 8.14% $Al_2O_3$
  About 7.92% $Na_2O$
  About 7.49% MgO
  About 4.80% CaO
  About 1.14% $Sb_2O_3$ The molten glass was formed into fibers on a conventional drawing wheel at 2560° F. at a speed of 9300 feet per minute. The glass fibers were found to have the following properties:
  Average tensile strength 864 thousand p.s.i.
  Average modulus of elasticity 11.6 million p.s.i.

EXAMPLE X 237.6 parts sand
42.0 parts aluminum hydrate
51.0 parts sodium carbonate
60.0 parts magnesium carbonate
20.0 parts crushed limestone The following glass was obtained:
  About 71.80% $SiO_2$
  About 8.25% $Al_2O_3$
  About 8.95% $Na_2O$
  About 7.66% MgO
  About 3.68% CaO The molten glass was formed into fibers on a conventional drawing wheel at 2560° F. at a speed of 9300 feet per minute. The glass fibers were found to have the following properties:
  Average tensile strength 560 thousand p.s.i.
  Average modulus of elasticity 10.9 million p.s.i.

When Example X is repeated using sufficient crushed limestone to give a calcium oxide content of about 6%, a good glass is obtained.

EXAMPLE XI 232.6 parts sand
42.0 parts aluminum hydrate
51.0 parts sodium carbonate
60.0 parts magnesium carbonate
30.0 parts crushed limestone The following glass was obtained:
  About 70.28% $SiO_2$
  About 8.25% $Al_2O_3$
  About 8.92% $Na_2O$
  About 7.68% MgO
  About 4.87% CaO The molten glass was formed into fibers on a conventional drawing wheel at 2560° F. at a speed of 9300 feet per minute. The glass fibers were found to have the following properties:
  Average tensile strength 462 thousand p.s.i.
  Average modulus of elasticity 10.7 million p.s.i.

Due to the fact that the glasses of this invention were melted and fiberized under various conditions and in furnaces of varying design, the melting temperature for each individual glass is not listed. Because of these variables, melting temperatures can be misleading. Variables other than composition and glass fiber furnace design affect the temperatures necessary for fiberization of the glass. These variables include head of glass (level in furnace), rate of draw, and the environmental conditions directly beneath the furnace such as the cooling method used. Generally a water cooling system is satisfactory. The glasses have been melted in bulk form in commercially available containers fired by natural gas and air mixtures at temperatures between about 2600 and 2900° F. and in fiber form, in precious metal, preferably platinum, resistance heated bushings at temperatures varying from about 2300° F. to about 2900° F. depending upon the above-mentioned variables.

The usual impurities which are present in the glasses include $TiO_2$ and $Fe_2O_3$ and occur in such small quantity, less than about 0.02%, that they do not affect the composition.

While preferred embodiments of the invention have been described above, it will be understood that this invention may be otherwise variously embodied within the scope of the following claims:

We claim:
1. A glass composition consisting essentially of:
   About 67% to about 74% silica,
   About 6.5% to about 10% aluminum oxide,
   About 6.5% to about 10% sodium oxide,
   About 6.5% to about 10% magnesium oxide,
   About 3% to about 6% calcium oxide,
   Up to about 2.5% antimony oxide.
2. A high tensile glass fiber consisting essentially of:
   About 67% to about 74% silica,
   About 6.5% to about 10% aluminum oxide,
   About 6.5% to about 10% sodium oxide,
   About 6.5% to about 10% magnesium oxide,
   About 3% to about 6% calcium oxide,
   Up to about 2.5% antimony oxide.
3. A glass composition consisting essentially of:
   About 69.80% $SiO_2$
   About 8.04% $Al_2O_3$
   About 8.68% $Na_2O$
   About 8.71% MgO
   About 4.76% CaO
4. A glass composition consisting essentially of:
   About 69.33% $SiO_2$
   About 9.87% $Al_2O_3$
   About 8.63% $Na_2O$
   About 7.44% MgO
   About 4.72% CaO
5. A glass composition consisting essentially of:
   About 70.66% $SiO_2$
   About 8.14% $Al_2O_3$
   About 8.79% $Na_2O$
   About 7.58% MgO
   About 4.81% CaO
6. A glass composition consisting essentially of:
   About 69.52% $SiO_2$
   About 9.70% $Al_2O_3$
   About 8.65% $Na_2O$
   About 7.46% MgO
   About 4.66% CaO
7. A glass composition consisting essentially of:
   About 70.26% $SiO_2$
   About 8.9% $Al_2O_3$
   About 7.05% $Na_2O$
   About 7.54% MgO
   About 4.78% CaO
   About 2.27% $Sb_2O_3$
8. A glass composition consisting essentially of:
   About 71.41% $SiO_2$
   About 8.22% $Al_2O_3$
   About 7.17% $Na_2O$
   About 3.26% CaO
   About 7.61% MgO
   About 2.31% $Sb_2O_3$
9. A high tensile glass fiber consisting essentially of:
   About 69.80% $SiO_2$

About 8.04% Al$_2$O$_3$
About 8.68% Na$_2$O
About 8.71% MgO
About 4.76% CaO

10. A high tensile glass fiber consisting essentially of:
About 69.33% SiO$_2$
About 9.87% Al$_2$O$_3$
About 8.63% Na$_2$O
About 7.44% MgO
About 4.72% CaO 11. A high tensile glass fiber consisting essentially of:
About 70.66% SiO$_2$
About 8.14% Al$_2$O$_3$
About 8.79% Na$_2$O
About 7.58% MgO
About 4.81% CaO 12. A high tensile glass fiber consisting essentially of:
About 69.52% SiO$_2$
About 9.70% Al$_2$O$_3$
About 8.65% Na$_2$O
About 7.46% MgO
About 4.66% CaO 13. A high tensile glass fiber consisting essentially of:
About 70.26% SiO$_2$
About 8.9% Al$_2$O$_3$
About 7.05% Na$_2$O
About 7.54% MgO
About 4.78% CaO
About 2.27% Sb$_2$O$_3$ 14. A high tensile glass fiber consisting essentially of:
About 71.41% SiO$_2$
About 8.22% Al$_2$O$_3$
About 7.17% Na$_2$O
About 3.26% CaO
About 7.61% MgO
About 2.31% Sb$_2$O$_3$

References Cited

UNITED STATES PATENTS

| | | | |
|---|---|---|---|
| 2,883,296 | 4/1959 | Labino | 106—50 |
| 3,007,806 | 11/1961 | Hartwig | 106—50 |
| 3,008,841 | 11/1961 | Tiede | 106—50 |
| 3,013,888 | 12/1961 | De Lajarte | 106—50 |
| 3,189,471 | 6/1965 | Thomas | 106—50 |

FOREIGN PATENTS 124,553 6/1939 Australia.

HELEN M. McCARTHY, *Primary Examiner.*